United States Patent
Rambusch

(10) Patent No.: US 10,661,546 B2
(45) Date of Patent: May 26, 2020

(54) METHOD OF MAKING ADHESIVE TAPE FOR WRAPPING CABLES

(71) Applicant: certoplast Technische Klebebaender GmbH, Wuppertal (DE)

(72) Inventor: Rene Rambusch, Wuppertal (DE)

(73) Assignee: certoplast Technische Klebebaender GmbH, Wuppertal (DE)

( * ) Notice: Subject to any disclaimer, the term of this patent is extended or adjusted under 35 U.S.C. 154(b) by 209 days.

(21) Appl. No.: 15/324,695

(22) PCT Filed: Jul. 24, 2015

(86) PCT No.: PCT/EP2015/067070
§ 371 (c)(1),
(2) Date: Jan. 7, 2017

(87) PCT Pub. No.: WO2016/012617
PCT Pub. Date: Jan. 28, 2016

(65) Prior Publication Data
US 2017/0204299 A1   Jul. 20, 2017

(30) Foreign Application Priority Data
Jul. 25, 2014  (DE) .................. 10 2014 110 535

(51) Int. Cl.
*B32B 38/04* (2006.01)
*C09J 7/21* (2018.01)
(Continued)

(52) U.S. Cl.
CPC .............. *B32B 38/04* (2013.01); *B32B 5/022* (2013.01); *B32B 37/12* (2013.01); *C09J 7/21* (2018.01);
(Continued)

(58) Field of Classification Search
CPC ... B32B 5/022; B32B 37/12; B32B 2038/047; B32B 2405/00; C09J 2201/20
See application file for complete search history.

(56) References Cited

U.S. PATENT DOCUMENTS 5,496,605 A * 3/1996 Augst ................. A61F 13/0273
428/43
5,874,142 A * 2/1999 Hoffmann ................. G09F 3/10
281/2
(Continued)

FOREIGN PATENT DOCUMENTS

DE  202006010886 U  10/2006
DE  102011005200 A   9/2012
(Continued)

OTHER PUBLICATIONS

Midha et al., Bulk and physical properties of needle-punched nonwoven fabrics, 2005, Indian Journal of Fibre & Textile Research, vol. 30—Jun. 2005—pp. 218-229 (Year: 2005).*

*Primary Examiner* — Kelly M Gambetta
(74) *Attorney, Agent, or Firm* — Andrew Wilford

(57) ABSTRACT

The invention relates to a method for producing an adhesive tape, in particular a wrapping tape to be wrapped around cables in automobiles. In said method, at least one face of a perforated support (1) is coated with an adhesive. According to the invention, a mechanically and/or chemically reinforced nonwoven fabric is used as the perforated support (1).

8 Claims, 1 Drawing Sheet

(51) Int. Cl.
 *B32B 5/02* (2006.01)
 *B32B 37/12* (2006.01)

(52) U.S. Cl.
 CPC ..... *B32B 2038/047* (2013.01); *B32B 2405/00* (2013.01); *C09J 2201/122* (2013.01); *C09J 2201/20* (2013.01); *C09J 2203/302* (2013.01); *C09J 2400/263* (2013.01)

(56) References Cited

U.S. PATENT DOCUMENTS

| | | |
|---|---|---|
| 6,936,553 B2 | 8/2005 | von Samson |
| 8,809,239 B2 | 8/2014 | Chun |
| 2005/0271860 A1 | 12/2005 | Quednau |
| 2009/0291303 A1 | 11/2009 | Kopf |
| 2012/0228794 A1* | 9/2012 | Martin ............. B29B 9/16 264/69 |
| 2012/0238172 A1* | 9/2012 | Siebert ............. B32B 5/022 442/334 |

FOREIGN PATENT DOCUMENTS

| | | | |
|---|---|---|---|
| EP | 0942057 A | 9/1999 | |
| EP | 1108769 A | 6/2001 | |
| EP | 1123958 A | 8/2001 | |
| EP | 1108769 B1 * | 3/2004 | ............. C09J 7/21 |
| JP | 04-222265 A * | 8/1992 | ............. D04H 3/14 |

\* cited by examiner

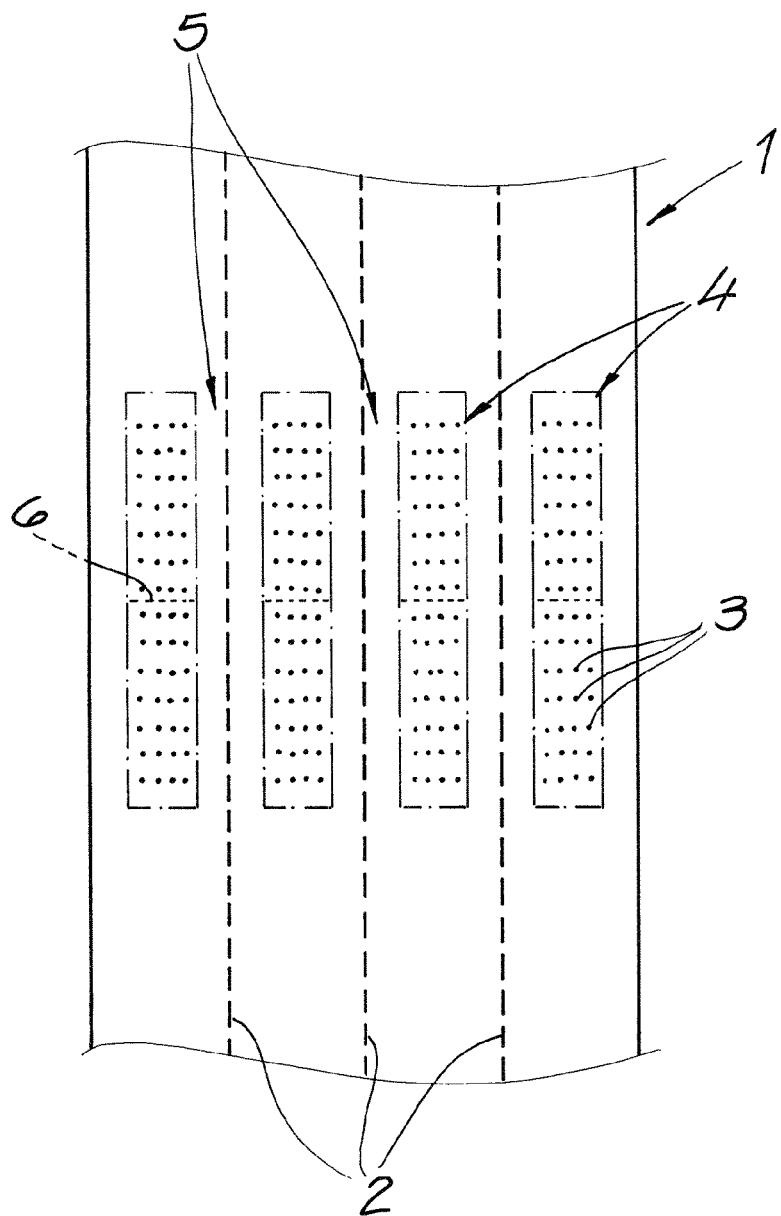

METHOD OF MAKING ADHESIVE TAPE FOR WRAPPING CABLES

CROSS REFERENCE TO RELATED APPLICATIONS

This application is the US-national stage of PCT application PCT/EP2015/067070 filed 24 Jul. 2015 and claiming the priority of German patent application 102014110535.4 itself filed 25 Jul. 2014.

The invention relates to a method of making an adhesive tape, according to which a perforated substrate is coated on at least one side with an adhesive. An adhesive tape having the construction described above is known from DE 20 2006 010 886. Of interest here is a multilayer construction of the substrate coated on both sides with a pressure-sensitive adhesive. The adhesive tape has a predetermined tear line at at least one location. In fact, a plurality of predetermined tear lines can be provided at this location, particularly by perforation, stamping or cuts. The individual layers are made of plastic, for example polyester, polyamide, polyethylene, polypropylene, or polyurethane. Each layer is a film.

Beside those adhesive tapes generally used for a wide variety of applications, wrapping tapes for wrapping cables in automobiles are known in a variety of forms. On the one hand, such wrapping tapes must be able to withstand mechanical stresses in the automobile. On the other hand, it is necessary that the wrapping tapes in question be resistant to acids, gasoline, oil, etc. Finally, such wrapping tapes must also able to withstand the temperatures occurring in the automobile, which can reach 80° C. and even more. To make such wrapping tapes easier to work with, it is often required that they be able to be torn by hand transversely.

A very wide variety of approaches in this regard are known from the prior art. For instance, EP 0 942 057 relates to an adhesive tape with a band-shaped, polyester-based spunbonded substrate. The stretch-to-break of the spunbonded substrate is limited to values below 50%.

In addition, EP 2 128 212 [US 2009/0291303] describes an adhesive tape with a textile substrate for winding around a cable. Here, the substrate is constructed of at least one layer of a prebonded nonwoven. This is a spunbond nonwoven, for example, that is overstitched with a plurality of threads. The primary aim of this is to impart the necessary longitudinal strength with transverse tearability still being required.

An adhesive tape with a nonwoven substrate band for bundling cables in automobiles in which the nonwoven substrate is needled by streams of air or water is described in EP 1 123 958. The nonwoven substrate is a needled staple nonwoven. The fibers used to make the nonwoven can be synthetic fibers such as polyester, polyamide, and/or polypropylene.

DE 101 49 071 [U.S. Pat. No. 6,936,553] relates to a method of sheathing elongated items such as cable sets in particular. The covering and/or substrate material provided here for the adhesive tape can be a woven fabric, a warp-knitted fabric, or even a nonwoven. Moreover, tear lines are provided in the form of rows of perforations.

DE 10 201 1 005 200 relates to an adhesive tape for sheathing elongate items such as cable sets in particular and to a method for sheathing. In order to optimize manual tearability, perforations can be present.

Finally, DE 10 2004 027 557 [US 2005/0271860] discloses the use of an adhesive tape that is self-adhesive on one side as a venting tape. In this case, a substrate is provided on one side with a hot-melt adhesive. The adhesive tape is perforated with the aid of hot needles that also penetrate the adhesive coating. A nonwoven can also be used as a substrate material. Since both the substrate and the adhesive coating are perforated, a certain level of air permeability is achieved that is especially advantageous for the intended purpose.

The prior art is unable to provide a solution that is satisfactory in all respects. For instance, in the case of a tape for wrapping cables in automobiles, which represent the primary use of the adhesive tape according to the invention, not only chemical, mechanical, and temperature resistance is required. Rather, manual tearability is also required in principle, which is typically given if transverse tensile strength of about 10 N/cm is provided in the adhesive tape. All measures aimed at increasing the strength of the adhesive tape, such as overstitching with longitudinal or transverse threads in terms of a needle-punched nonwoven, are counterproductive in this respect. The same is true if the substrate is otherwise bonded, for example with a binder or through needling. In any event, the conflicting objectives are very difficult to reconcile, especially while also endeavoring to achieve a competitive price. It is in this regard that the invention as a whole aims to provide a remedy.

The object of the invention is to provide a method of making an adhesive tape and particularly a wrapping tape for wrapping cables in automobiles with the aid of which not only an adhesive tape that is predestined for the described application is provided at low cost, but rather also is simultaneously given the necessary strength longitudinally with a simple possibility for transverse tearing.

To attain this object, a method of making an adhesive tape is provided according to which a substrate of nonwoven fabric is first bonded mechanically and/or chemically, upon which the substrate is perforated, or vice versa, and the perforated and bonded substrate is then is coated on at least one side with an adhesive.

According to the invention, manufacture of the adhesive tape occurs such that the steps "bonding-perforation-coating" are taken in this sequence. Alternatively to this, the process sequence "perforation-bonding-coating" can be employed that is expressed by the expression "or vice versa." In the last-mentioned case, one will usually proceed such that the bonding preceding the perforation is generally done mechanically. In this way, the mechanical bonding on the one hand and the perforation on the other hand can be adapted to each other. For example, it is conceivable to provide mechanical bonding only in those areas which lie outside of the perforations to be applied subsequently. In principle, this can of course also be done with chemical bonding that generally covers the substrate in sections, in which case sections to be perforated are left out during chemical bonding. That is, the bonding is generally performed in such a way that the substrate is bonded only in sections, with perforated sections or sections to be perforated being left out. In general, the substrate can of course also be bonded over its entire surface.

In relation to the invention, a specially finished nonwoven substrate is thus used, namely one that is mechanically and/or chemically bonded. After bonding, the substrate of nonwoven fabric, or nonwoven substrate, undergoes special finishing in that it is perforated. All of this takes place before the adhesive is applied to at least one side of the substrate perforated in this way or the coating of one side with adhesive is performed. That is, unlike the teaching according to DE 10 2004 027 557, the perforations generally do not penetrate through the coating with the adhesive, but rather are limited to the substrate. The invention proceeds here from the discovery that it is the substrate that nearly exclusively imparts the mechanical characteristics of the finished adhesive tape with respect to stretch, tensile strength, manual tearability, etc. Therefore, as soon as the substrate as such reaches the required longitudinal strength for the specific intended application as a wrapping tape and, at the same time, the manual tearability transversely is present, the coating with the adhesive generally no longer changes anything in this regard.

In fact, the perforations that generally run longitudinally and the perforation lines defined by them usually have the effect of improving manual tearability transversely or even making it possible in the first place. In the area of the perforations and perforation lines, the manual tearability corresponds to a transverse tensile strength of typically less than 10 N. The tensile strength is determined according to AFERA standard 4007.

In fact, as a result of the transverse rows of perforations, a decrease in the tensile strength is generally observed in comparison to the nonwoven substrate without perforations of at least 10%, particularly 20%, and preferably 30% and more transversely defined by the perforation lines. That is, the perforation rows that are typically applied transversely in certain intervals along the perforation lines defined in this manner ensure that the tensile strength of the associated nonwoven substrate in the direction of the respective perforation line decreases by at least 10%, particularly by 20%, and preferably by 30% and more in comparison to the non-perforated substrate with the same finishing.

Moreover, the invention proceeds here from the discovery of making the size of the perforation holes small enough that no penetration occurs to the other side during the subsequent coating with the adhesive. Furthermore, this design rule prevents the perforation holes in question from becoming clogged by the adhesive. In this regard, any conceivable adhesives can be used here. So-called hot-melt adhesives are preferred, i.e. those that are applied in a molten state to one side of the substrate and then cool. The adhesive coating or hot-melt adhesive used here is general acrylate- or rubber-based.

Moreover, the adhesive coating typically has a weight per unit area from 30 to 200 $g/m^2$ and particularly a weight per unit area from 50 to 130 $g/m^2$. Direct coating or knife coating is especially advantageous.

As explained previously, the substrate is a nonwoven substrate. This nonwoven substrate may have a weight per unit area from 20 $g/m^2$ to 300 $g/m^2$ and particularly from 40 $g/m^2$ to 100 $g/m^2$. Moreover, the thickness of the nonwoven substrate is typically from 0.2 to 2.0 mm. The transverse tensile strength is generally in the range of 10 N/m or less. The longitudinal stretch-to-break can have values of up to 50% and is preferably in the range from 30% to 40%.

As already explained, the mechanically and/or chemically bonded substrate or nonwoven substrate is perforated. The nonwoven fabric or nonwoven substrate can be bonded chemically by a binder. As is known, in bonding the individual fibers of the nonwoven substrate using binder, the fibers are adhered to one another. Various methods for applying the binder in question are conceivable and used in the context of the invention.

It is especially preferred if the binder is applied to at least one side of the substrate or nonwoven substrate. This can be done by common methods such as spraying, rolling, doctoring, or even by printing. As will readily be understood, it lies within the scope of the invention to provide supplementary bonding measures, such as calendaring or, generally, rolling, after the application of the binder. Such additional methods are usually not necessary, however. Instead of the chemical bonding of the nonwoven fabric or nonwoven substrate using a binder as described above, it is alternatively or additionally conceivable for the nonwoven to be bonded mechanically by overstitching with threads. In that case, a stitch bonded fabric or stitch bonded warp-knitted fabric is achieved. The overstitching can be performed both with longitudinal threads and transverse threads.

In relation to the invention, it has proven to be especially propitious and beneficial if the nonwoven is overstitched exclusively with longitudinal threads having, for example, a thread density of less than 22 threads per 25 mm width of the substrate. By virtue of this finishing with longitudinal threads, the nonwoven or stitch bonded fabric produced in this way can be perforated in an especially simple and trouble-free manner.

After all, the mechanically and/or chemically consolidated nonwoven is generally perforated with the aid of hot needles. The needles can be provided on a needle roller. Alternatively, however, it is also conceivable for the needles to be provided on a needle board. In both cases, the needles can be provided in a defined pattern that avoids the overstitched longitudinal threads of the substrate to be perforated. In other words, the needle roller carrying the needles or also the needle board carrying the needles are each designed such that the needles occupy longitudinal strips that are mutually spaced apart.

The spacing or gap between these individual longitudinal strips on the needle roller or needle board is dimensioned and provided such that, during the perforation of the chemically and/or mechanically consolidated nonwoven fabric or nonwoven substrate, no needles penetrate into the consolidated nonwoven substrate in the area of the longitudinal threads. Instead, the above-mentioned gaps and spaces between the individual longitudinal strips are located in the area of the longitudinal threads. As a result, no mechanical contact occurs during perforation of the nonwoven substrate between the overstitched longitudinal threads on the one hand and the hot needles penetrating into the nonwoven substrate to form the perforations on the other hand. The longitudinal threads can thus continue to impart their stabilizing and strengthening effect on the nonwoven substrate even after the perforation process, especially longitudinally.

As will readily be understood, it is generally also possible and lies within the scope of the invention for the longitudinal strips provided with needles to be provided on the needle roller or needle board such that there are not only spaces and gaps between longitudinal strips but also transversely, i.e. from longitudinal strip to longitudinal strip. In that case, the configuration of the needle roller or needle board with the needles will be selected such that, in the area of the spaces or gaps transversely, possible transverse threads can be additionally provided for the overstitching of the nonwoven substrate. To simplify production, however, only longitudinal threads will generally be used in this context, or such longitudinal threads can of course be omitted in general if the nonwoven is consolidated exclusively by chemicals. As explained previously, the needles on the needle roller or on the needle board are hot, with their temperature typically exceeding 100° C. In particular, temperatures of greater than 150° C. are even observed. As a result, each hot needle is easily able to penetrate through the substrate or nonwoven substrate during perforation. After all, the substrate material, which is typically a plastic such as polyester, polypropylene, polyamide, etc., melts immediately at such temperatures. In general, however, the nonwoven substrate can also be made of viscose fibers such as cotton fibers. It has generally proven to be propitious in this regard if a more or less smooth counter-roller or counter-plate is provided opposite the needle roller or needle board with the substrate located therebetween. The counter-roller or counter-plate can be provided with a rubber coating into which the individual needles penetrate after penetrating through the substrate, thus preventing damage to their tips. At the same time, the counter-roller or counter-plate ensures that the substrate is perforated flawlessly and held and transported between the needle roller or needle board and the counter-roller or counter-plate. To this end, the needle roller and counter-roller can be driven so as to rotate counter to one another just like the needle board and counter-plate, for example linearly.

The fibers can be both staple fibers and spun fibers. In either case, the temperature of the needles is sufficient to cause the substrate material to melt in the area of the needle. Moreover, the substrate material is simultaneously forced through the needle hole, thus resulting in consistent holes in the nonwoven substrate. When the needles are pulled out, a cooling process is initiated simultaneously in the marginal region of the perforations formed in this way. The substrate material that was previously molten in the area of the perforation hole therefore becomes solid again, and the perforation is permanently present in the nonwoven substrate. The same advantages and characteristics are obviously also observed if the needles are at room temperature, i.e, not heated.

The diameter of the needles and, as a consequence thereof, the diameter of the perforation holes typically lies between 0.5 mm and 1.5 mm and is particularly in the range between 0.9 and 1.0 mm. As a result, the perforation holes lead to the desired transverse weakening of the nonwoven substrate in particular, which facilitates its manual tearability. For this reason, the needle holes will usually be spaced transversely with less spacing than longitudinally. For example, it is conceivable for the spacing of the needles to be set so as to be twice as great or more longitudinally than transversely (each with respect to the substrate).

At the same time, the size of the perforation holes is small enough that no penetration occurs to the other side during the subsequent coating with the adhesive, and the holes are prevented from becoming clogged by the adhesive. Rather, due to the cohesive force in the adhesive, it can be assumed that the adhesive will either not or practically not penetrate into the perforation holes, so that the consumption of adhesive does not increase in comparison to conventional nonwoven substrates without perforation holes. The number of needles can have a density of about 3/cm$^2$ and particularly 5/cm$^2$ and more. In general, the number of holes in the area of the appropriately finished longitudinal strips on the needle roller or on the needle board is at least 10 holes/cm$^2$. As a result, the nonwoven substrate is finished with perforation lines that run transversely and, with the exception of the open areas, are continuous with the longitudinal threads provided there. Since the longitudinal threads continue to provide mechanical stabilization longitudinally of the nonwoven substrate, the perforation cannot be expected to result in a significant weakening of the nonwoven substrate longitudinally.

The use of an adhesive tape that has been made according to the described method, particularly as a tape for wrapping cables in automobiles, is also an object of the invention. Consequently, a method of making an adhesive tape, the thus produced adhesive tape, and the use of the adhesive tape as a wrapping tape for wrapping cables in automobiles are provided that are generally characterized by an overall cost-effective product and special suitability for the described intended application. In essence, this is achieved through a combination of the chemical and/or mechanical consolidation of the nonwoven substrate with the additionally applied perforations as finishing after manufacture of the nonwoven substrate. Herein lie the fundamental advantages.

The invention is explained in further detail below with reference to a schematic drawing that illustrates only one embodiment. The sole FIGURE shows an adhesive tape made according to the method according to the invention. The adhesive tape shown schematically in the FIGURE has a perforated substrate 1 being primarily visible. This substrate 1 is shown in a top view. A coating with adhesive (not shown) is applied to its rear side. The substrate 1 is a perforated nonwoven. It has first been consolidated mechanically and/or chemically for this purpose. Here the substrate 1 has been consolidated by overstitching with the aid of longitudinal threads 2. This is therefore a stitch bonded nonwoven. For this purpose, the longitudinal threads 2 have been applied to the substrate 1 in the embodiment by overstitching with a thread density of <22 threads/25 mm width of the substrate 1. In general, a stitch length of about 3 mm or more is used here for the longitudinal threads 2.

The substrate 1 consolidated mechanically in this manner by overstitching is then perforated. For this purpose, the mechanically consolidated substrate 1 is worked with the aid of needles 3 shown generally, which are illustrated generally in the sole FIGURE. The needles 3 together form longitudinal strips 4. Longitudinally extending spaces or gaps 5 are thus formed in the substrate 1 between the respective longitudinal strips 4.

The overall configuration is such that the needles 3 are mounted on a needle roller or on a needle board and have a density of at least 3/cm$^2$. Moreover, the needles 3 have a defined pattern on the needle roller or on the needle board, which is reflected in the longitudinal strips 4 in FIG. 1. It can be seen that the longitudinal spacing of the needles 3 is about twice as great as their transverse spacing. In fact, the individual longitudinal strips 4 in FIG. 1 can be done by a rolling movement of the needle roller (not shown) in consideration of one revolution. The needles 3 are provided on the needle roller such that the longitudinal strips 4 are respectively formed there, particularly with the interposed spaces or gaps 5. It can be seen that the spaces or gaps 5 between the individual longitudinal strips 4 are of equal size. Moreover, the spaces or gaps 5 are always located in areas in which the overstitched longitudinal threads 2 are provided on the substrate 1. This means that the pattern of the needles 3 on the needle roller or on the needle board is configured and provided on the needle roller or on the needle board such that the overstitched longitudinal threads 2 of the substrate 1 to be perforated are left out, because the spaces or gaps 5 in the area of the longitudinal threads 2 are placed between the individual longitudinal strips 4 during perforation. That is, the needle roller or needle board and the substrate 1 must be aligned opposite to one another during perforation, for example relative to a common reference line longitudinally, which can be one or both longitudinal edges of the substrate 1.

In this way, the needles 3 on the needle roller or needle board ensure during perforation of the longitudinal substrate 1 in its longitudinal extension that only the areas between the overstitched longitudinal threads 2 are perforated and that no perforation occurs in the area of the longitudinal threads 2, because the needles 3 are left out there on the needle roller, meaning that spaces or gaps 5 are found there. As a result, no collision occurs during perforation between the hot needles 3 and the longitudinal threads 2, so that the strength thereof is not impaired even after perforation.

Nevertheless, continuous perforation lines 6 are present, particularly in the transverse extension of the substrate 1, which are left out only in the area of the spaces or gaps 5. The adhesive tape made in this manner can be torn transversely without any difficulty along these perforation lines 6, with tensile strengths of less than 10 N/cm being typically observed.

Consequently, the finished adhesive tape is especially suitable for applications as wrapping tape for wrapping cables in automobiles. This is especially the case in view of the fact that fibers based on polyester, polypropylene, polyamide, etc., are used as fibers for making the substrate or nonwoven substrate 1. Furthermore, the nonwoven fabric can be a spunbond nonwoven or staple-fiber nonwoven. The continuous longitudinal threads 2 provide the necessary strength and longitudinal stretch-to-break, which is generally less than 30% and particularly less than 20%. Nevertheless, the perforation lines 6 provide for the desired manual tearability transversely. These are the basic advantages.

The invention claimed is:

1. A method comprising the steps of:
   providing a longitudinally extending substrate of nonwoven fabric;
   providing an array of hot needles and a counter-roller or counter-plate with a rubber coating adjacent the array;
   mechanically or chemically consolidating the substrate;
   before or after consolidation, perforating the substrate by penetration with the hot needles at a temperature of more than 100° C. and arrayed to form longitudinally extending and transversely spaced needled strips in the substrate such that the hot needles penetrate through the substrate and into the rubber coating, the needles being spaced more closely transversely of the substrate than longitudinally thereof; thereafter
   transporting the substrate while penetrated by the needles by displacing the counter-roller or counter-plate with the array of needles;
   coating the perforated and consolidated substrate with an adhesive on at least one side to form a tape; and
   using the tape for wrapping cables in an automobile.

2. The method defined in claim 1, wherein the nonwoven fabric is consolidated chemically by a binder.

3. The method defined in claim 2, further comprising the step of:
   applying the binder to the one side of the substrate by spraying, rolling, or doctoring.

4. The method defined in claim 1, wherein the nonwoven fabric is consolidated mechanically by longitudinal overstitching with threads.

5. The method defined in claim 4, wherein the nonwoven fabric is overstitched with longitudinal threads having a thread density of <22 threads/25 mm width of the substrate.

6. The method defined in claim 1, further comprising the step of:
   providing the needles on a needle roller with a density of at least 3/cm$^2$.

7. The method defined in claim 4, wherein the needles are provided in a defined pattern that avoids the overstitched longitudinal threads of the substrate to be perforated.

8. The method defined in claim 1, wherein the substrate is perforated such that the size of the perforations is such that there is no penetration completely through the substrate at the perforations during the subsequent coating with the adhesive, whereby the perforation holes are prevented from becoming clogged by the adhesive.

* * * * *